(12) United States Patent
Palli et al.

(10) Patent No.: US 11,240,236 B2
(45) Date of Patent: Feb. 1, 2022

(54) METHODS FOR AUTHORIZING USE OF AN APPLICATION ON A DEVICE

(71) Applicant: Mastercard International Incorporated, Purchase, NY (US)

(72) Inventors: Sekhar Palli, Orissa (IN); Vinesh Gaadhe, Gujarat (IN); Asif Kadiwala, Gujarat (IN); Nirmish Dholakia, Gujarat (IN); Gaurav Dayal, Pune (IN); Asheesh Agarwal, Gujarat (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 154 days.

(21) Appl. No.: 16/142,755

(22) Filed: Sep. 26, 2018

(65) Prior Publication Data
US 2019/0199720 A1    Jun. 27, 2019

(30) Foreign Application Priority Data

Dec. 22, 2017    (SG) ............................ 10201710770V

(51) Int. Cl.
| | |
|---|---|
| *H04L 29/06* | (2006.01) |
| *G06Q 20/40* | (2012.01) |
| *G06Q 20/36* | (2012.01) |
| *G06Q 20/32* | (2012.01) |
| *G06Q 20/38* | (2012.01) |

(52) U.S. Cl.
CPC ..... *H04L 63/0876* (2013.01); *G06Q 20/3227* (2013.01); *G06Q 20/3229* (2013.01); *G06Q 20/36* (2013.01); *G06Q 20/3821* (2013.01); *G06Q 20/40* (2013.01); *G06Q 20/4014* (2013.01); *H04L 63/102* (2013.01)

(58) Field of Classification Search
CPC .............. H04L 63/0876; H04L 63/102; G06Q 20/3227; G06Q 20/3229; G06Q 20/36; G06Q 20/3821; G06Q 20/40; G06Q 20/4014
USPC .......................................................... 726/4
See application file for complete search history.

(56) References Cited

U.S. PATENT DOCUMENTS

| | | | | |
|---|---|---|---|---|
| 9,219,824 | B1* | 12/2015 | Harper | ................ H04M 17/204 |
| 9,549,317 | B2* | 1/2017 | Jindal | ................ H04W 12/068 |
| 10,616,223 | B2* | 4/2020 | Mori | ................ G06Q 20/3278 |
| 2011/0125642 | A1* | 5/2011 | Kamal | ................ G06Q 20/20 |
| | | | | 705/44 |

(Continued)

OTHER PUBLICATIONS

Continuous Authentication and Authorization for the Internet of Things Muhammad Shahzad, Munindar P. Singh IEEE Internet Computing vol. 21 Issue: 2, Mar. 2017, pp. 86-90 (Year: 2017).*

(Continued)

*Primary Examiner* — Samson B Lemma
*Assistant Examiner* — Mohammad S Shams
(74) *Attorney, Agent, or Firm* — Talem IP Law, LLP

(57) ABSTRACT

According to an embodiment, there is provided a method for authorizing use of an application on a device. The method includes: identifying a plurality of device identifiers of the device; determining authorization information based on predetermined one or more of the plurality of device identifiers; and determining authorization for use of the application on the device in response to the authorization information.

17 Claims, 9 Drawing Sheets

(56) References Cited

U.S. PATENT DOCUMENTS

| | | | | |
|---|---|---|---|---|
| 2013/0212007 A1* | 8/2013 | Mattsson | ............ | G06Q 20/382 705/39 |
| 2013/0303203 A1* | 11/2013 | Wang | ............ | H04W 68/00 455/458 |
| 2014/0067683 A1* | 3/2014 | Varadarajan | ............ | G06Q 20/04 705/44 |
| 2014/0195428 A1* | 7/2014 | Ghetler | ............ | G06Q 20/40 705/44 |
| 2015/0120472 A1* | 4/2015 | Aabye | ............ | G06Q 20/40 705/16 |
| 2015/0161612 A1* | 6/2015 | Parento | ............ | G06Q 20/4018 705/44 |
| 2016/0019536 A1* | 1/2016 | Ortiz | ............ | G06Q 20/3227 705/67 |
| 2016/0094991 A1* | 3/2016 | Powell | ............ | H04W 12/06 455/411 |
| 2016/0119296 A1* | 4/2016 | Laxminarayanan | ...... | H04L 9/14 713/168 |
| 2016/0189154 A1* | 6/2016 | Eramian | ............ | G06Q 20/4014 705/44 |
| 2016/0275492 A1* | 9/2016 | Brickell | ............ | G06Q 20/12 |
| 2016/0314467 A1* | 10/2016 | Bonalle | ............ | G06Q 20/26 |
| 2017/0098220 A1* | 4/2017 | Kumawat | ............ | H04L 61/6022 |
| 2017/0124565 A1* | 5/2017 | Arora | ............ | G06Q 20/3674 |
| 2017/0171173 A1* | 6/2017 | Chandrasekaran | ..... | H04W 4/02 |
| 2017/0200142 A1* | 7/2017 | Pappano | ............ | G06Q 20/4016 |
| 2017/0353860 A1* | 12/2017 | Zhang | ............ | H04W 48/02 |
| 2018/0204209 A1* | 7/2018 | Kohli | ............ | G06Q 30/0201 |
| 2018/0330342 A1* | 11/2018 | Prakash | ............ | G06Q 20/4014 |
| 2019/0109713 A1* | 4/2019 | Clark | ............ | H04L 9/3239 |
| 2019/0116493 A1* | 4/2019 | Cyril | ............ | H04W 12/69 |
| 2019/0182253 A1* | 6/2019 | Mori | ............ | G06Q 20/4018 |

OTHER PUBLICATIONS

Authentication and Authorization for the Internet of Things Hokeum Kim, Edward A. Lee Publisher: IEEE, IT professional, University of California, Berkeley, vol. 9, Issue 5, pp. 27-33, 2017 (Year: 2017).*

* cited by examiner

METHODS FOR AUTHORIZING USE OF AN APPLICATION ON A DEVICE

CROSS-REFERENCE TO RELATED APPLICATION

This application is a U.S. National Stage filing under 35 U.S.C. § 119, based on and claiming benefits of and priority to Singapore Patent Application No. 10201710770V filed on Dec. 22, 2017. The entire disclosure of the above application is incorporated herein by reference for all purposes.

FIELD OF INVENTION

The present invention relates broadly, but not exclusively, to methods for authorizing use of an application on a device and to computing devices.

BACKGROUND

Devices are often identified by an identifier that is unique to the device. Problems may arise in authenticating the device or in other verification processes if the device includes more than one such identifier.

A need therefore exists to provide devices and methods to address the above problem.

SUMMARY

According to a first aspect, there is provided a method for authorizing use of an application on a device. The method includes: identifying a plurality of device identifiers of the device; determining authorization information based on pre-determined one or more of the plurality of device identifiers; and determining authorization for use of the application on the device in response to the authorization information.

According to a second aspect, there is provided a computing device including: at least one processor; and at least one memory including computer program code; the at least one memory and the computer program code configured to cause the at least one processor to: identifying a plurality of device identifiers of the computing device; determining authorization information based on predetermined one or more of the plurality of device identifiers; and determining authorization for use of an application on the device in response to the authorization information.

According to a third aspect, there is provided a method for authorizing use of a digital wallet application on a device. The method includes: identifying a plurality of device identifiers of the device; sorting the plurality of device identifiers in accordance with a pre-determined sorting rule; determining authorization information based on a result of the sorting; and authorizing use of the digital wallet application on the device in response to the authorization information.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Overview

Figure 1A:
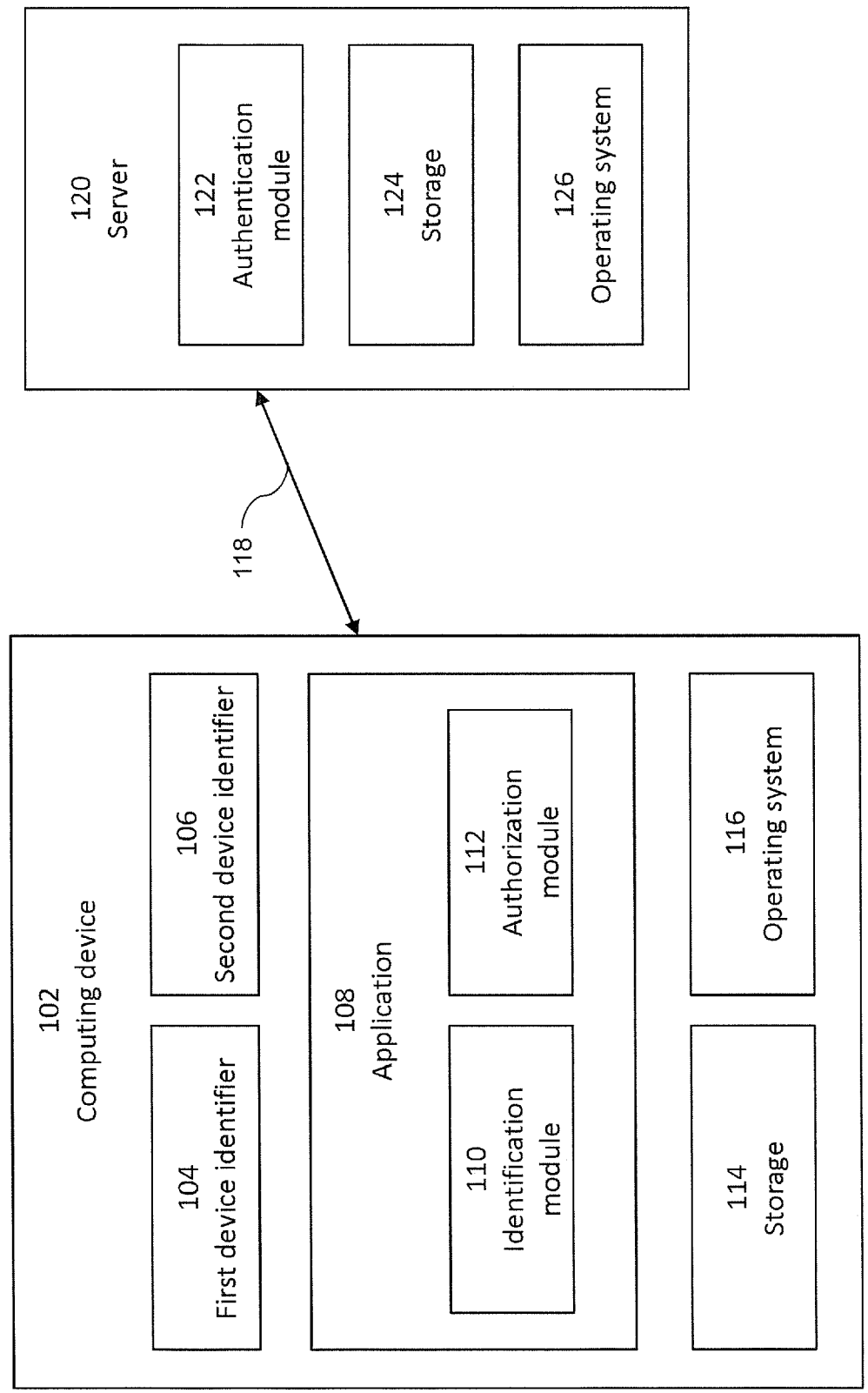
FIG. 1A shows an overview of a system in accordance with an embodiment of the present disclosure.

FIG. 1A shows an overview of a system 100 in accordance with an embodiment of the present disclosure. A computing device 102 may have a plurality of device identifiers, for example a first device identifier 104 and a second device identifier 106. The computing device 102 may include an application 108, and authorization for using the application 108 may depend on an identifier (for example one or more international mobile equipment identities, mobile equipment identifiers, media access control addresses, or international mobile subscriber identities) of the computing device 102. As such, it may advantageously be ensured that the application is only executed on authorized devices.

The application 108 may be an application that is provided on various devices, including devices that only have one device identifier, and as such, the application 108 performs authorization on one (and only one) device identifier. Since the computing device 102 includes more than one identifier, an identification module 110, which may for example be provided in the application 108, or which may be provided separate from the application 108 on the computing device 102, is configured to determine all of the device identifiers of the computing device 102 (i.e. the first device identifier 104 and the second device identifier 106). An authorization module 112, which may for example be provided in the application 108, or which may be provided separate from the application 108, determines authorization information based on the first device identifier 104 and the second device identifier 106. The authorization information is determined so that independent of which of the first device identifier 104 and the second device identifier 106 the computing device 102 provides as a primary (or first) device identifier, the authorization information is always identical and preferably unique to the computing device 102. This determination of the authorization information may be based on a rule (wherein the rule indicates how to use the first device identifier 104 and the second device identifier 106 to obtain the authorization information), and this rule may be stored on the computing device 102, for example in a storage 114. In another example, the rule may be stored in the application 108.

After the authorization information is determined, it is used for authorization of use of the application 108, in response to transmitting the authorization information (or data based on the authorization information) to a server 120, and receiving a response from the server 120, as indicated by arrow 118. For example, the server 120 includes a storage 124, in which an expected authorization information is stored, and the server 120 compares the expected authorization information stored in the storage 124 with authorization information received from the computing device 102 in order to determine authorization. If the expected authorization information stored in the storage 124 matches the authorization information received from the computing device 102, authorization is granted; otherwise, authorization is rejected.

The computing device 102 includes an operating system 116, which facilitates execution of the application 108, including the identification module 110 and the authorization module 112. Similarly, the server 120 includes an operating system 126, which facilitates execution of the authorization module 122.

Terms Description (in Addition to Plain and Dictionary Meaning of Terms)

A "computing device" as used herein may be a mobile phone, a tablet device, a handheld computer, a portable computer, or a desktop computer (or personal computer), and may include program instructions related to an application.

An "application" (or for short: "app") as used herein may be a program that is executed on the computing device, and may for example be a payment application or a digital wallet or an electronic wallet, or any other application for which it is desired that it is executed only on authorized computing devices.

"Authorization" may refer to the process of determining whether the right to execute the application is granted or not. For example, if authorization is granted, the application may be executed in a fully operational mode, while if authorization is denied, the application may either not be executed at all or the application may be executed in a restricted mode, for example merely to indicate that authorization has been denied and to indicate instructions to a user of how to obtain authorization.

A "device identifier" is a number or a string (or any other piece of information that may be sorted according to a certain criterion), which is unique to a computing device. In some computing devices, there is more than one device identifier (for example a first device identifier and a second device identifier), and each of the more than one device identifiers may be unique to the computing device. For example, in a dual SIM (subscriber identity module), there are two SIM card slots, and each SIM card slot has a unique identifier (which may be referred to as IMEI (International Mobile Equipment Identity), so that the device in total has (at least) the two IMEIs, which may provide for two unique device identifiers (i.e. a first device identifier and a second device identifier).

Exemplary Embodiments

Embodiments will be described, by way of example only, with reference to the drawings. Like reference numerals and characters in the drawings refer to like elements or equivalents. It is the intent of present embodiments to present methods and devices, in which an ambiguity of multiple device identifiers can be resolved.

Figure 1B:
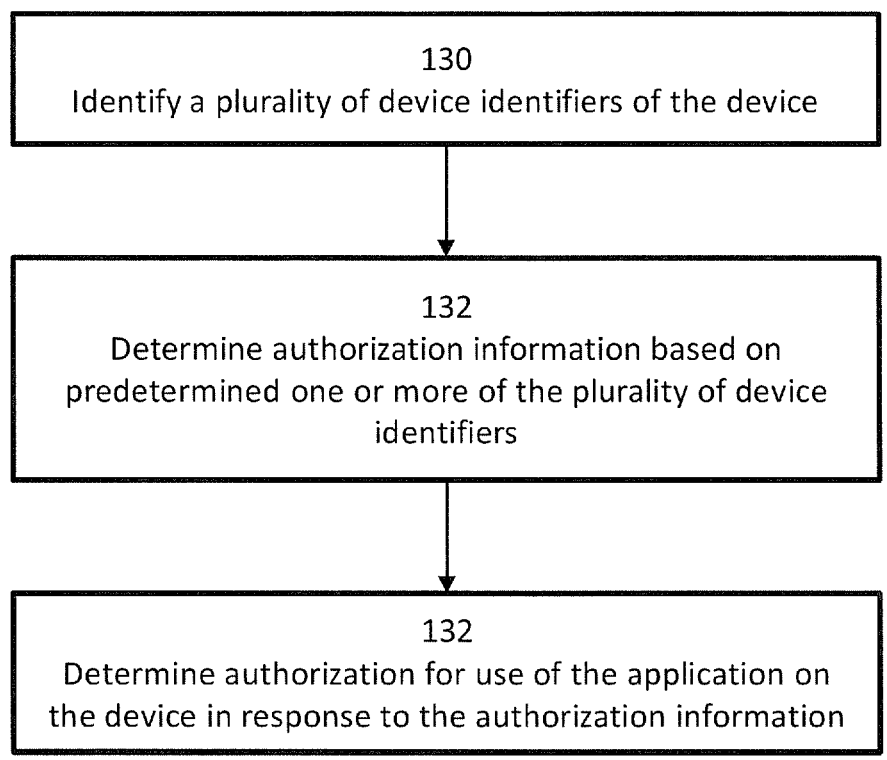
FIG. 1B shows a flow diagram illustrating a method for authorizing use of an application on a computing device in accordance with an embodiment of the present disclosure.

FIG. 1B shows a flow diagram 128 illustrating a method for authorizing use of an application on a computing device in accordance with an embodiment of the present disclosure. The application on the device may include or may be a digital wallet application, or any other application for which it is desired that it is linked to a specific computing device (in other words: which shall only be allowed to be executed on the specific computing device).

The computing device may include a plurality of device identifiers. For example, if the computing device is a dual SIM phone, the computing device includes at least the two identifiers of the two SIM card slots (i.e. the identifier (for example IMEI) of the first SIM card slot may be a first device identifier of the computing device, and the identifier (for example IMEI) of the second SIM card slot may be a second device identifier of the computing device). At step 130, a plurality of device identifiers of the computing device are identified. For example, the computing device (or for example, the application on the computing device) issues a system call to the operation system to retrieve the device identifiers. The operating system may return the device identifiers, but the operating system may not provide the device identifiers in a specific order. In another example, the operating system may only offer an option to retrieve one device identifier at a time, and it may be random which of the plurality of device identifiers are returned in response to a system call; as such, it may be necessary to repeatedly perform the system call to retrieve a device identifier to increase the chance of obtaining all available device identifiers.

The plurality of device identifiers may include an International Mobile Equipment Identity, a mobile equipment identifier, a media access control address, or an international mobile subscriber identity. It will be understood that while International Mobile Equipment Identity, a mobile equipment identifier, a media access control address are related to the computing device as such, an international mobile subscriber identity is related to a SIM (subscriber identity module) card provided in the device, and as such, if the international mobile subscriber identity is used as a device identifier, the subsequent processing (such as authorization) would depend on the SIM card inserted into the device.

At step 132, authorization information is determined based on a predetermined one or more of the plurality of device identifiers. In other words, it may not be necessary to include all of the received device identifiers to determine the authorization information.

The authorization information may be determined in accordance with a pre-determined rule. Information indicating the pre-determined rule may be stored on the device. For example, a rule may be created or set or selected from a list of possible rules, and at the time when setting up (or registering) the application, the rule may be applied to the predetermined one or more of the plurality of device identifiers, and the authorization information obtained when setting up may be communicated to the server and stored there for future actual authorization purposes. As such, when setting up the application and when actually performing authorization, the same rule is applied. This advantageously increases security, because the user of the computing device may select the rule only once, and information related to the rule may be stored independent from the application, so that leakage of the application would still not reveal the rule.

The rule may include: determining a minimum of the plurality of device identifiers; and/or determining a maximum of the plurality of device identifiers; and/or determining an average of the predetermined one or more of the plurality of device identifiers; and/or determining a sum of the predetermined one or more of the plurality of device identifiers; and/or determining an exclusive or combination of the predetermined one or more of the plurality of device identifiers; and/or determining a combination of the predetermined one or more of the plurality of device identifiers; and/or determining a combination of a subset of the predetermined one or more of the plurality of device identifiers; and/or appending the predetermined one or more of the plurality of device identifiers according to a pre-determined logic; and/or appending the plurality of device identifiers in ascending order to determine the authorization information; and/or appending the predetermined one or more of the plurality of device identifiers in descending order; and/or appending a subset of the predetermined one or more of the plurality of device identifiers.

At step 134, authorization is determined for use of the application on the device in response to the authorization information. Authorization may be determined further in response to comparing the authorization information with information retrieved from a server, for example with the information provided to the server when initializing (or registering) the application.

For example, on Android platforms, an API (application programming interface) to retrieve a Device ID (identifier), for example an IMEI (International Mobile Equipment Identity), may be controlled by device manufacturers. Dual SIM (subscriber identity module) devices may hold two different IMEIs, for example one per SIM (or one per SIM slot). As such, on dual SIM devices, there may be reliability issues in retrieving Device ID details. Such devices may return a Device ID of either of the SIM slots at different point of time against a "getDeviceId( )" API call, and hence may impact existing device fingerprint algorithms. There is no uniform implementation across device manufacturers in returning Device ID in the case of dual SIM devices.

Applications that rely on the Device ID (for example electronic wallets) from such devices may face device fingerprint mismatch errors (for example at a wallet server) and may remain blocked.

According to various embodiments, devices and methods may be provided that reliably retrieve (or derive) a Device ID for dual SIM devices. According to various embodiments, unique device identification may be provided for Android devices.

Once authorization is determined at step 134, the application may be started, or the application may proceed to a next step. For example, portions of the application that involve confidential data or that are related to transferring funds may only be executed after authorization is determined. In case authorization is rejected, the application may not be executed, or the application may be terminated, or the application may provide information to a user of the application how to properly obtain authorization.

In accordance with an embodiment of the present disclosure, it may be determined if authorization is rejected several times, and in case authorization is rejected several times, the use of the application (or even the use of the entire computing device) may be locked, for example permanently locked, or temporarily locked. In case of temporary locking, a time limit for unlocking may be applied (for example so as to unlock the application or the computing device after a pre-determined time), or unlocking may require higher level authorization and authentication (for example, the user of the computing device may be required to show up in person with an officer at a bank for unlocking, in case the application is a payment related application).

Figure 1C:
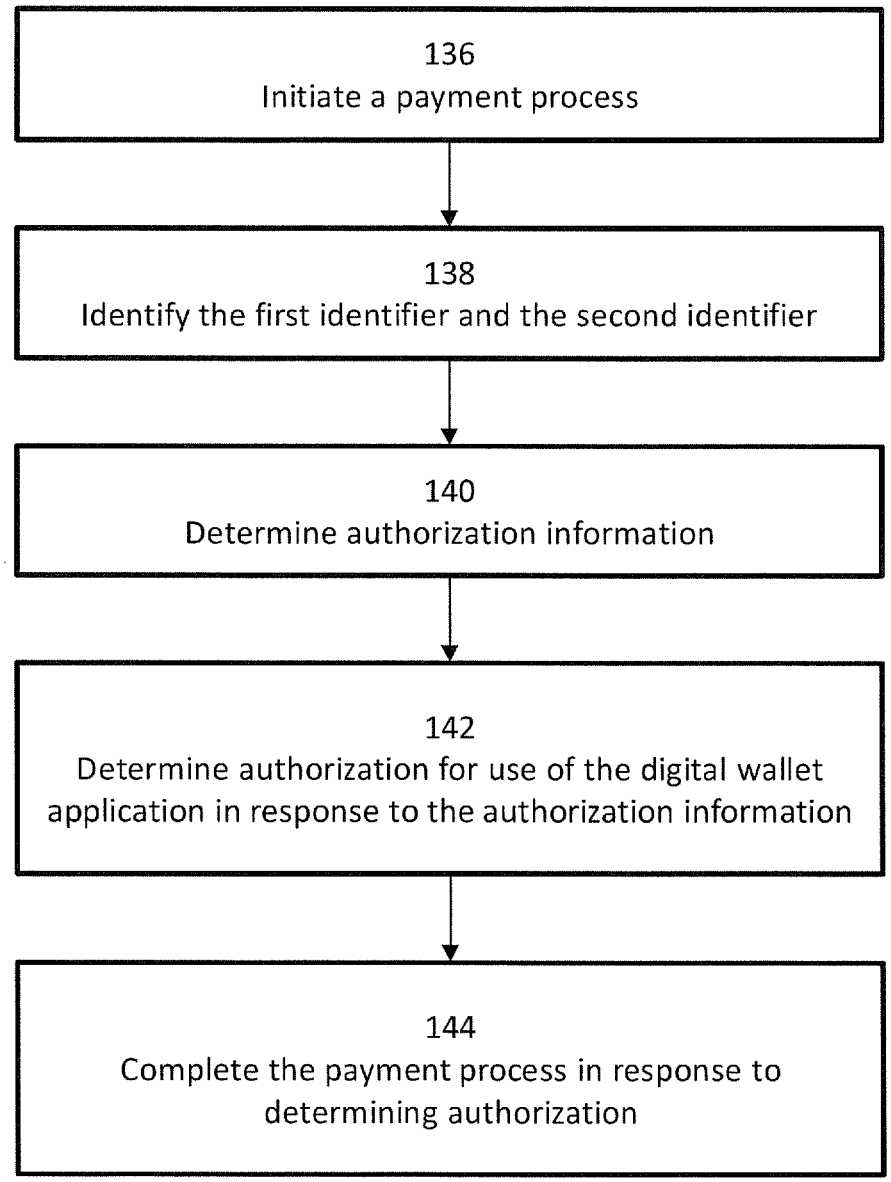
FIG. 1C shows a flow diagram illustrating a method for authorizing use of a digital wallet application on a dual SIM device in accordance with an embodiment of the present disclosure.

FIG. 1C shows a flow diagram 134 illustrating a method for authorizing use of a digital wallet application on a dual SIM device in accordance with an embodiment of the present disclosure. The dual SIM device has a first SIM card slot associated with a first identifier and a second SIM card slot associated with a second identifier, and may for example be the computing device 102 shown in FIG. 1A. At step 136, a user initiates a payment process, for example by tapping his dual SIM device a POS (point of sale) terminal, so that the dual SIM device may communicate with the POS terminal, for example using NFC (near-field communication). In another example, the user may initiate the payment process directly on his dual SIM device. The payment process may involve using the a digital wallet application, for example using Masterpass®.

After initiating the payment process at step 136, the dual SIM device, for example the digital wallet application of the dual SIM device (for example the identification module 110 of the application 108 as shown in FIG. 1A) identifies the first identifier and the second identifier at step 138. Thereafter, at step 140, the dual SIM device, for example the digital wallet application of the dual SIM device (for example the authorization module 112 of the application 108 as shown in FIG. 1A) determines authorization information in response to the first identifier and the second identifier, for example in accordance with a pre-determined rule, for example in accordance with at least one of: a maximum of the first identifier and the second identifier, a minimum of the first identifier and the second identifier, a concatenation of the first identifier and the second identifier, an average of the first identifier and the second identifier, a sum of the first identifier and the second identifier, or an exclusive or combination of the first identifier and the second identifier.

At step 142, the dual SIM device, for example the digital wallet application of the dual SIM device (for example the authorization module 112 of the application 108 as shown in FIG. 1A) determines authorization for use of the digital wallet application in response to the authorization information obtained at step 140.

In response to determining authorization at step 142, the payment process is completed at step 144.

With the processing as shown in FIG. 1C, payment is effected using the digital wallet application, the use of which has been authorized. This advantageously ensures that only an authorized dual SIM device can be used for completing a payment process using the digital wallet application.

Figure 2:
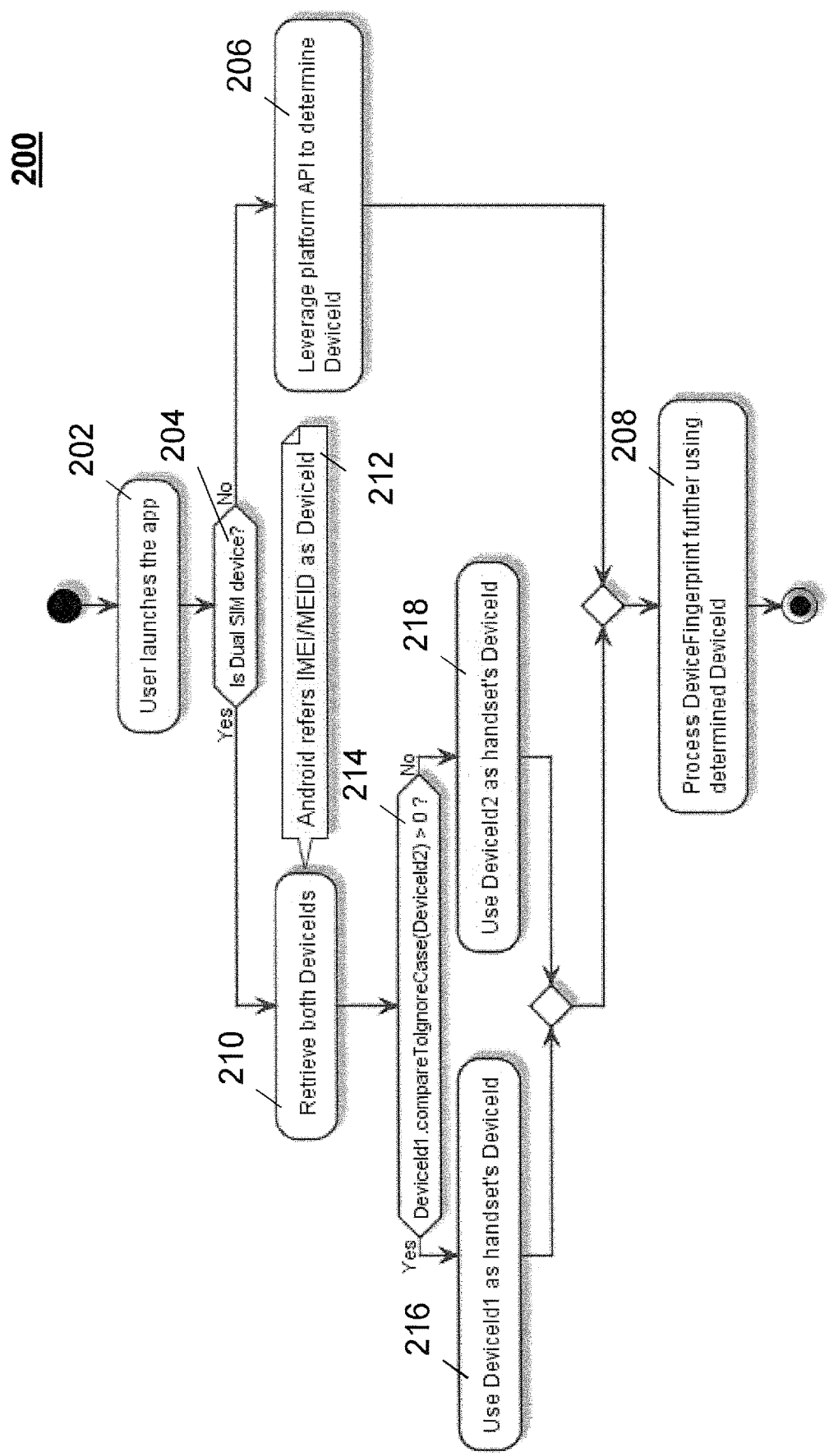
FIG. 2 shows an illustration of a new user registration in accordance with an embodiment of the present disclosure.

FIG. 2 shows an illustration 200 of new user registration in accordance with an embodiment of the present disclosure. At 202, a user may launch an application on a device (for example a handset). At 204, it may be determined whether the device is a dual SIM device. If it is determined at 204 that the device is not a dual SIM device, processing may continue to 206, where a platform API may be leveraged to determine a Device ID, and a device fingerprint may be processed further using the determined Device ID at 208. If it is determined at 204 that the device is a dual SIM device, processing may continue to 210, where both device IDs (for example a first device ID and a second device ID) may be retrieved. Like indicated by 212, it is to be noted that Android refers to an IMEI or MEID (mobile equipment identifier). At 214, the first device ID and the second device ID may be compared. If the first device ID is bigger than the second device ID, the first device ID may be set as the device's device ID (for example as the handset's device ID) at 216. If the second device ID is bigger than the first device ID, the second device ID may be set as the device's device ID (for example as the handset's device ID) at 218. It will be understood that the first device ID and the second device ID may not be identical, as each of the first device ID and the second device ID are unique identifiers for the device, i.e. each device ID only exists once. At 208, the device fingerprint may then be processed further using the determined devices' device ID (i.e. the first device ID or the second device ID, based on the comparison at 214).

Figure 3:
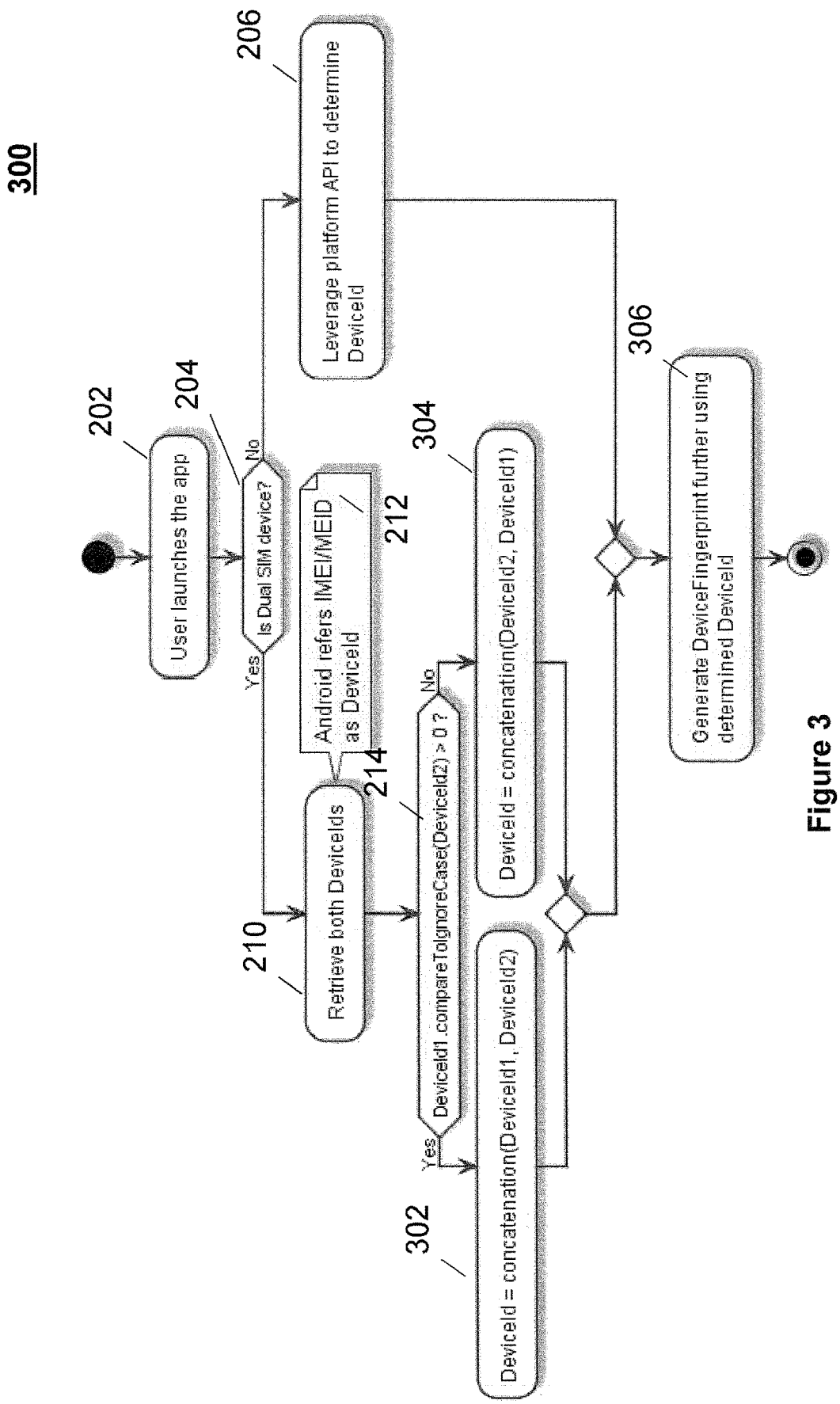
FIG. 3 shows an illustration of a new user registration in accordance with an embodiment of the present disclosure.

FIG. 3 shows an illustration 300 of new user registration in accordance with a further embodiment of the present disclosure. Various steps illustrated in FIG. 3 may be identical or similar to steps illustrated in FIG. 2, so that the same reference signs may be used and duplicate description may be omitted. If the first device ID is bigger than the second device ID, the second device ID may be appended to the first device ID, and this concatenation may be set as the device's device ID (for example as the handset's device ID) at 302. If the second device ID is bigger than the first device ID, the first device ID may be appended to the second device ID, and this concatenation may be set as the device's device ID (for example as the handset's device ID) at 304. In other words, independent of which device ID is the bigger device ID, always the biggest device ID is provided first, followed by the smaller device ID, as the device's device ID. At 306, a device fingerprint may be generated using the determined device ID.

The generation of the device fingerprint at 306 may be carried out as follows. According to various embodiments, a unique device fingerprint may be generated using unique device attributes, for example using unique Android device attributes. Different methods may be provided for telephony devices and for non-telephony devices.

According to various embodiments, for telephony devices (for example mobile phones), the device fingerprint may be determined as follows:
Device Fingerprint=Part_1+Part_2, where
Part_1=SHA256 (SHA256 (Serial_No)+SHA256 (Device ID)), and
Part_2=SHA256 (Android ID).

According to various embodiments, for non-telephony devices (for example for tablet computers without mobile radio communication modems), the device fingerprint may be determined as follows:
Device Fingerprint=Part_1+Part_2; where
Part_1=SHA256 (SHA256 (Serial_No)); and
Part_2=SHA256 (Android ID).

In the above equations, the following data is used:
Serial No—Hardware serial number of the device, for example an Android device;
Device ID—IMEI or MEID of the device if it has telephony capabilities;
Android ID—A 64-bit number (as a hex string) that is randomly generated when the user first sets up the device and will remain constant for the lifetime of the user's device;
SHA256—The SHA (Secure Hash Algorithm) is one of a number of cryptographic hash functions.

It will be understood that a cryptographic hash is like a signature for a text or a data file. The SHA-256 method may generate an almost-unique, fixed size 256-bit (32-byte) hash. A hash may provide a one way function which cannot be decrypted back.

Applications (for example (electronic) wallets) from existing users in production determine device fingerprints using a platform provided DeviceId. According to various embodiments, such applications (for example wallets) may be migrated as per the methods according to various embodiments.

Figure 4:
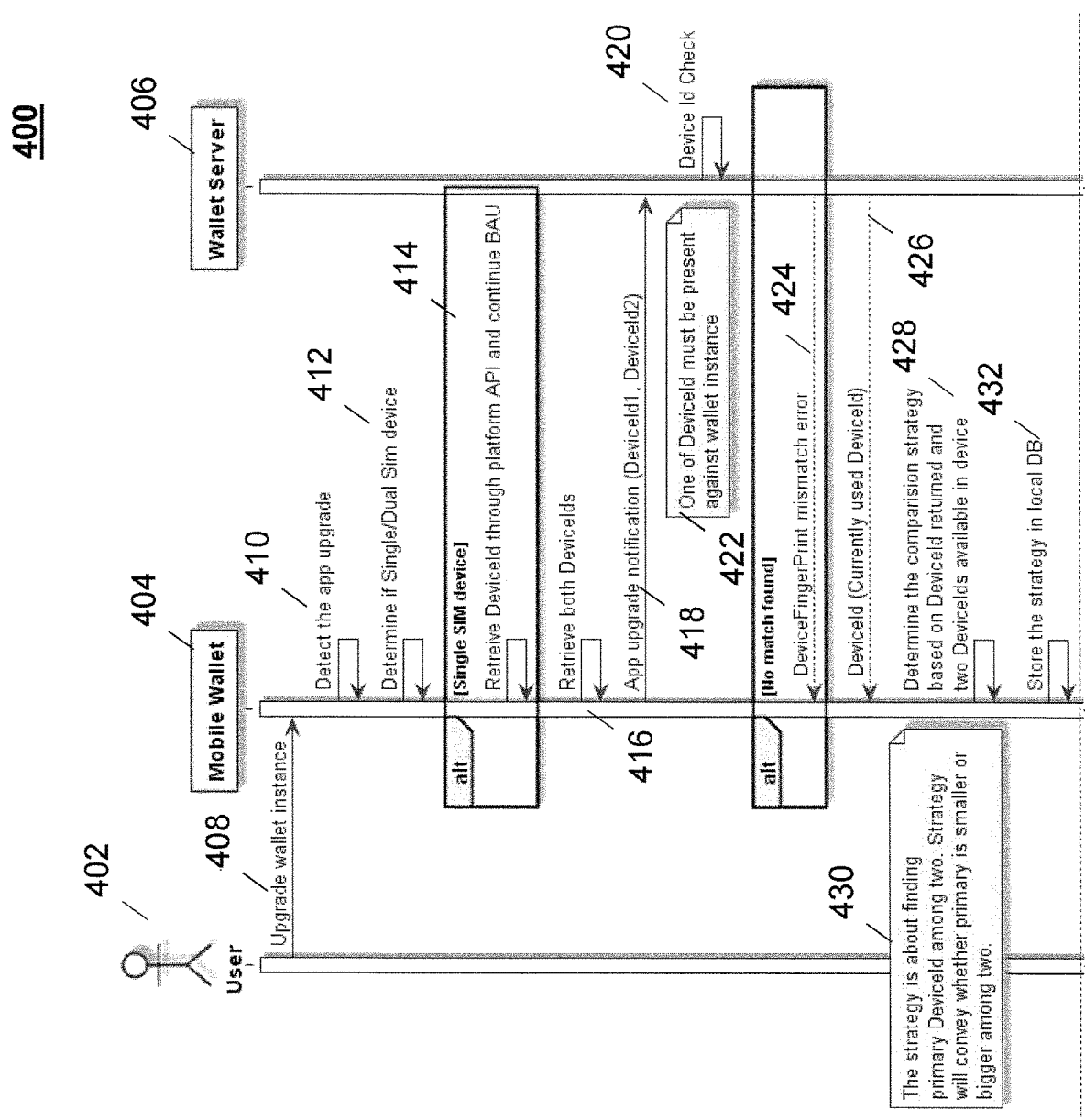
FIG. 4 shows a flow diagram illustrating a method for migration in accordance with an embodiment of the present disclosure.

FIG. 4 shows a flow diagram 400 illustrating a method for migration in accordance with an embodiment of the present disclosure. Communication between a user 402, a mobile wallet 404, and a wallet server 406 are shown. At 408, the user 402 may initiate an upgrade of a commonly used wallet application (which may also be referred to as wallet instance) towards the mobile wallet 404 in accordance with an embodiment of the present disclosure. At 410, the mobile wallet 404 may detect the application upgrade. At 412, the mobile wallet 404 may determine whether the device on which the mobile wallet 404 is provided is a single SIM device or a dual SIM device (or even a multiple SIM device with more than two SIMs). If it is determined at 412 that the device is a single SIM device, the device ID may be retrieved through a platform API, and business as usual (BAU) may be carried out at 414. If it is determined at 412 that the device is not a single SIM device (for example if it is determined that the device is a dual SIM device or a device with more than two SIMs), all device IDs may be determined at 416 (for example for a dual SIM device, both device IDs (a first device ID and a second device ID) may be determined). At 418, the mobile wallet 404 may send an application upgrade notification including all (in case of a dual SIM device: both) device IDs to the wallet server 406. The wallet server 406 may check the device IDs at 420. As illustrated at 422, one of the device IDs provided at 418 must be present for authorization of the wallet application on the (wallet) server 406 (for example to verify that the wallet application is rightfully used on the device). If no match is found (in other words, if none of the device IDs provided at 418 is present against the wallet application on the wallet server 406, a device fingerprint mismatch error may be communicated from the wallet server 406 to the mobile wallet 404 at 424. Otherwise, at 426, the currently used device ID may be provided from the wallet server 406 to the mobile wallet 404. At 428, a comparison strategy may be determined based on the device ID returned from the wallet server 406 at 426 and all the device IDs available in the device (as determined (or retrieved) at 416). As illustrated by 430, the strategy according to various embodiments concerns finding a primary device ID among two device IDs. The strategy may convey whether the primary device ID is smaller or bigger than the other device ID. In other words, a method may be determined for selecting a device ID to be used by the mobile wallet based on all device IDs of the device, and the method may be determined so that the selected device ID is the device ID which is already stored on the wallet server 406. At 432, the strategy may be stored in a local database (DB) at the mobile wallet 404.

Figure 5:
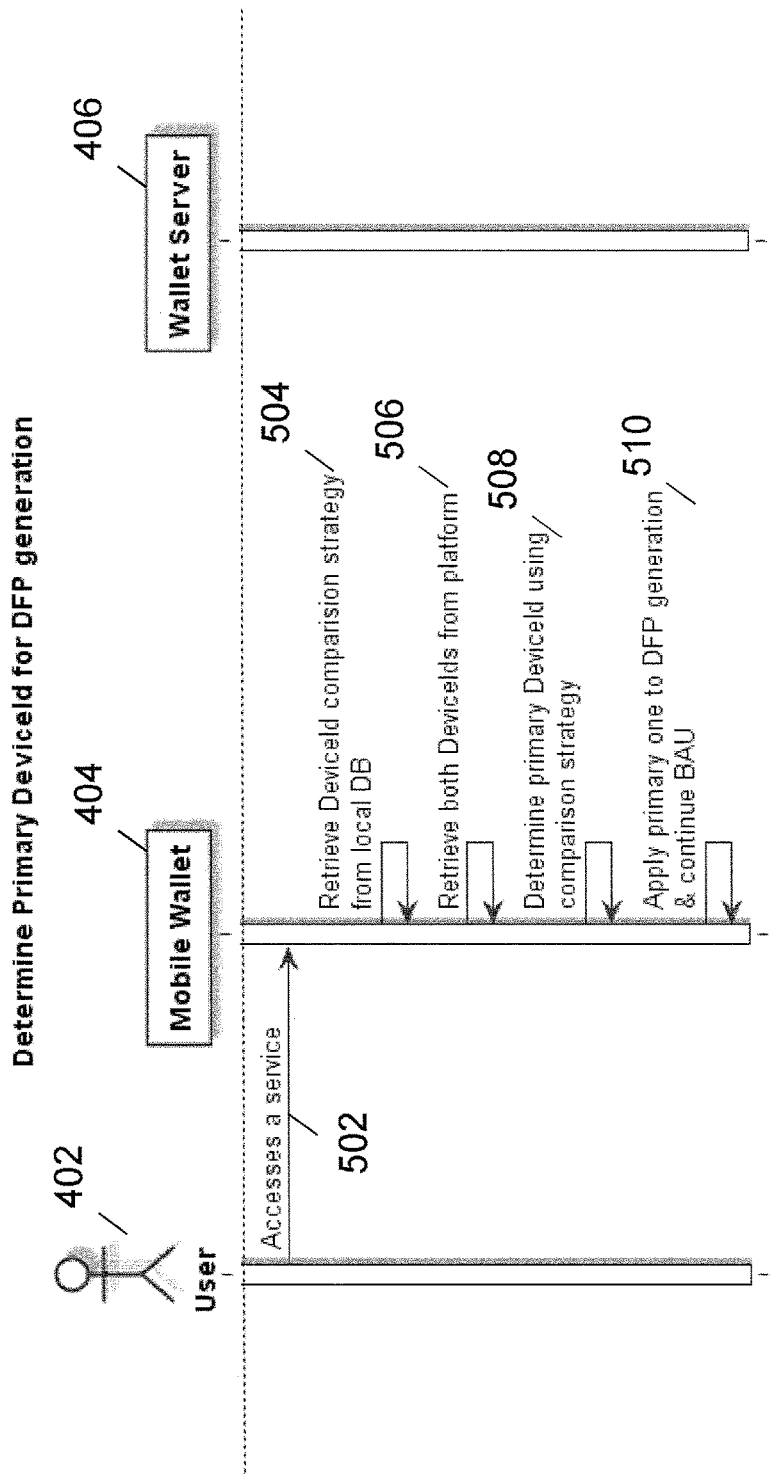
FIG. 5 show a flow diagram illustrating a method for determining a primary device ID for device fingerprint (DFP) generation in accordance with an embodiment of the present disclosure.

FIG. 5 show a flow diagram 500 illustrating a method for determining a primary device ID for device fingerprint (DFP) generation in accordance with an embodiment of the present disclosure. Communication between the user 402, the mobile wallet 404 and the wallet server 406 is shown. At 502, the user 402 may access a service (for example the mobile wallet 404). At 504, the mobile wallet 404 may retrieve a device ID comparison strategy (in other words: a strategy for comparing device IDs, for example a strategy which has been determined with a method as described in FIG. 4) from a local database. At 506, the mobile wallet 404 may retrieve all device IDs (for a dual SIM device: both device IDs) from the platform (for example from the device) on which the mobile wallet 404 is executed. At 508, the mobile wallet 404 may determine a primary device ID using the comparison strategy (that was retrieved from the local database at 504). At 510, the mobile wallet 404 may apply the primary device ID to the device fingerprint generation and may continue with business as usual.

According to various embodiments, a default comparison strategy may be provided. For example, as a default, the bigger one among two Device Ids (or the biggest one in case of two or more Device IDs) may be determined as a primary device ID, for example a first string in concatenation in the embodiment shown in FIG. 3.

According to various embodiments, integers may be stored in the local DB to identify comparison strategies. For example, "1" may mean "choose bigger id" (Since its default strategy, it may be skipped to store this information); and "2" may mean "choose smaller id". It will be understood that instead of storing an integer, any other kind of data may be stored, for example a Boolean value, to indicate which strategy is to be applied.

In the above example, sorting of the parameters (for example the various device IDs) for defining a unique device ID has been described. However, it will be understood that any other way of combining the parameters (including various device IDs) may be provided. For example, according to various embodiments, if a device has two IMEIs (for example IMEI1 and IMEI2) and 2 MAC (media access control) addresses (for example MAC1 and MAC2), a combination of these parameters may be used, such as, for example:

IMEI1+IMEI2+MAC1+MAC2, or
IME1+MAC1+IMEI2+MAC2, and so on.

It will be understood that even though two IMEIs and two MAC addresses are used for the illustrative example above, similar combinations may be formed independent from the number of IMEIs and MAC addresses.

According to various embodiments, Android devices, including dual SIM phones, may be uniquely identified, and this may aid in augmenting fraud detection with an ability to blacklist devices.

Various embodiments may aid the digital wallet's strategy and fraud detection capability.

Figure 6:
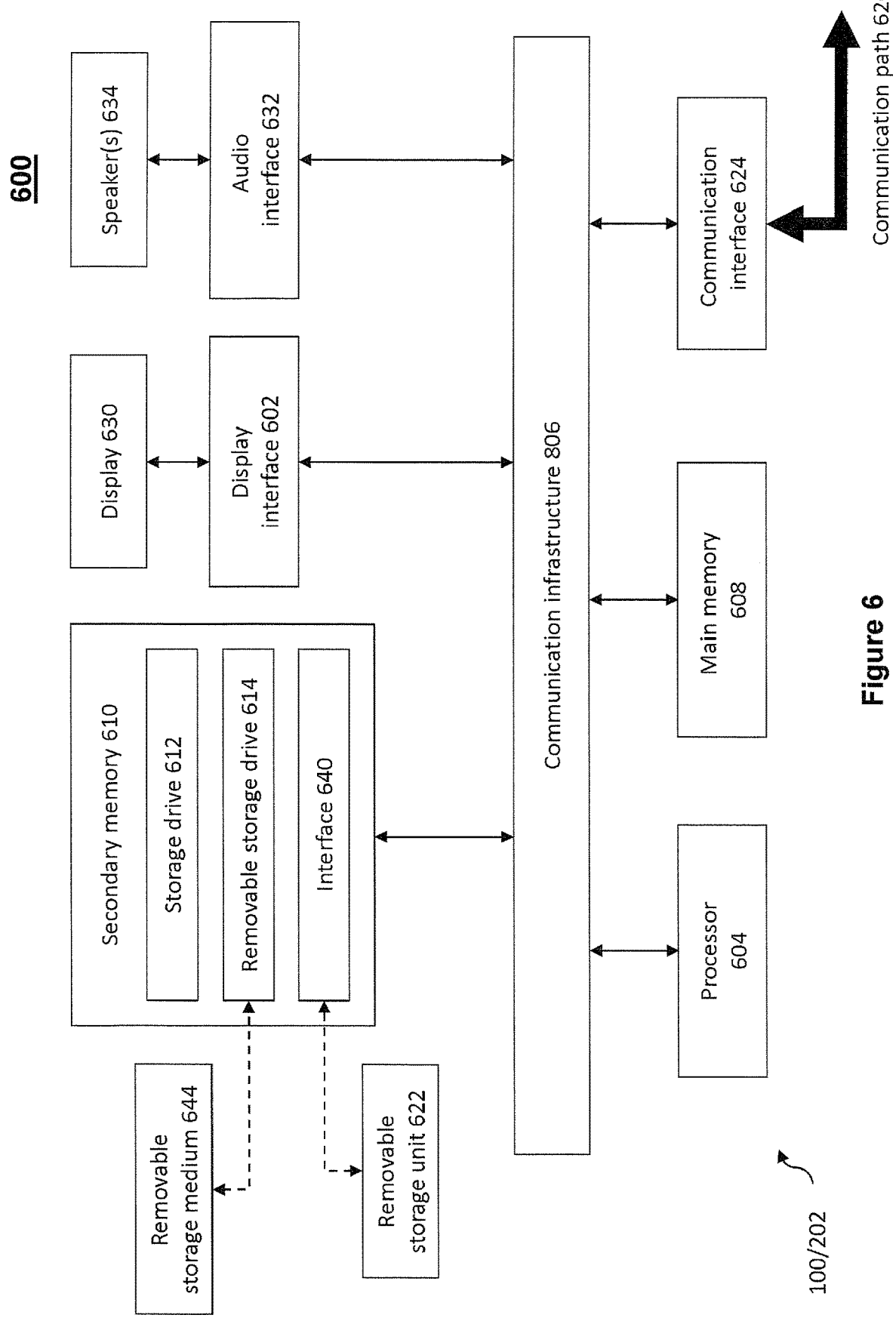
FIG. 6 depicts an exemplary computing device, in accordance with an embodiment of the present disclosure.

FIG. 6 depicts an exemplary computing device 600, hereinafter interchangeably referred to as a computer system 600 or as a server 600, where one or more such computing devices 600 may be used to implement the server 120 shown in FIG. 1A. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage medium, or the like, which is read by and written to by removable storage drive 614. As will be appreciated by persons skilled in the relevant art(s), the removable storage medium 644 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 650. Examples of a removable storage unit 622 and interface 650 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 650 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" (or computer readable medium, which may be a non-transitory computer readable medium) may refer, in part, to removable storage medium 644, removable storage unit 622, a hard disk installed in storage drive 612, or a carrier wave carrying software over communication path 626 (wireless link or cable) to communication interface 624. Computer readable storage media (or computer readable media) refers to any non-transitory, non-volatile tangible storage medium that provides recorded instructions and/or data to the computing device 600 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 650. The computer program product may be a non-transitory computer readable medium. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. The main memory 608 and/or the secondary memory 610 may serve(s) as the memory for the server 120 shown in FIG. 1A; while the processor 604 may serve as the processor of the server 120 shown in FIG. 1A.

Figure 7:
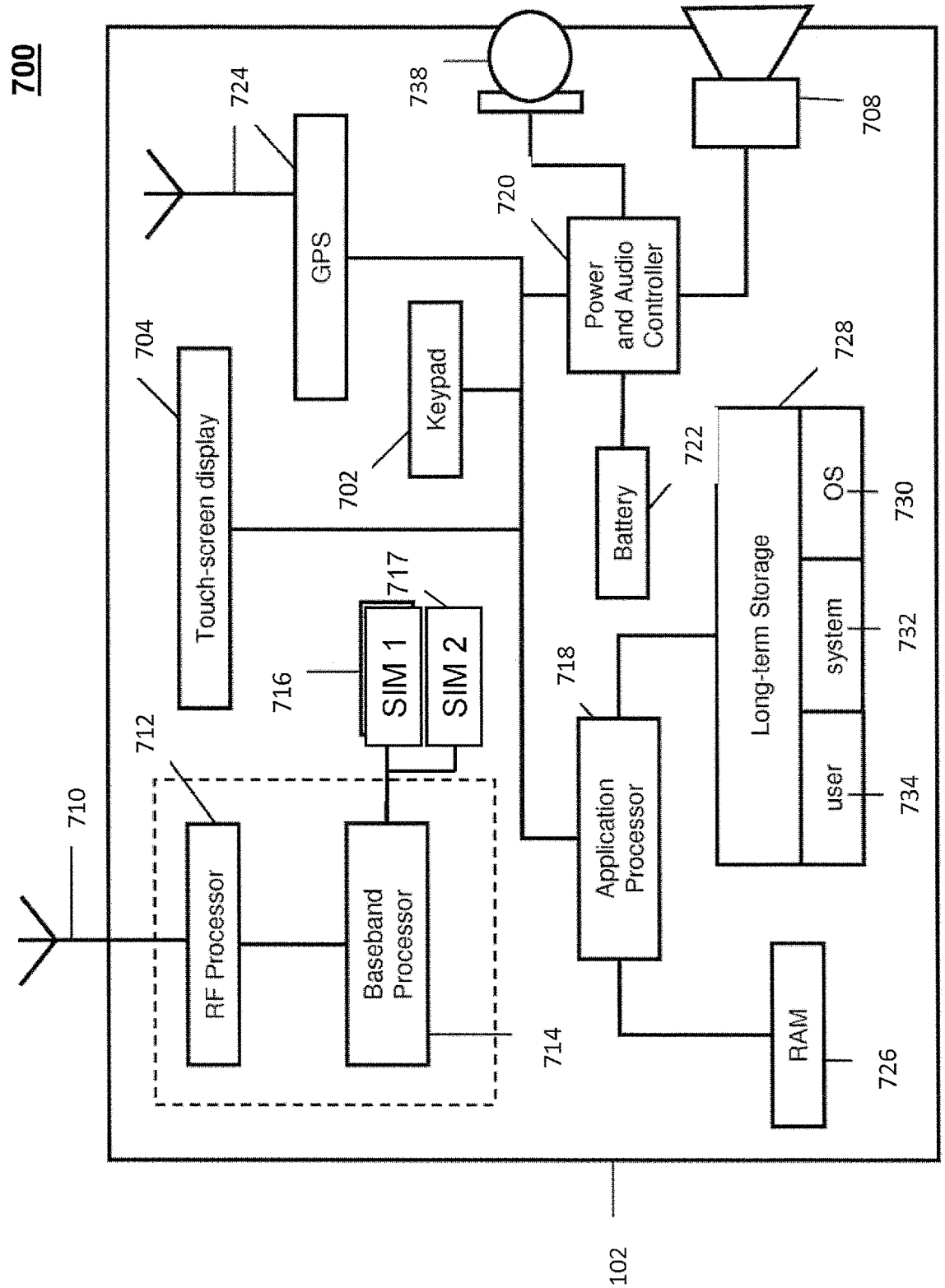
FIG. 7 is a schematic of a wireless device, in accordance with an embodiment of the present disclosure.

FIG. 7 is a schematic of a wireless device 700 that may be utilized to implement the devices and methods shown in FIG. 1A and FIG. 1B, for example the computing device 102 shown in FIG. 1A. The wireless device 700 comprises a keypad 702, a touch-screen or a touch-screen display 704, a microphone 738, a speaker 708 and an antenna 710. The wireless device 700 may be capable of being operated by a user to perform a variety of different functions, such as, for example, hosting a telephone call, sending an SMS message, browsing the Internet, sending an email and providing satellite navigation.

The wireless device 700 may include hardware to perform communication functions (e.g. telephony, data communication), together with an application processor and corresponding support hardware to enable the wireless device have other functions, such as, messaging, Internet browsing, email functions and the like. The communication hardware is represented by the RF processor 712 which provides an RF signal to the antenna 710 for the transmission of data signals, and the receipt therefrom. Additionally provided is a baseband processor 714, which provides signals to and receives signals from the RF Processor 712. The baseband processor 714 also interacts with a first subscriber identity module 716 and a second subscriber identity module 717 (so that the wireless device 700 is a dual SIM device). Each of the first subscriber identity module 716 and a second subscriber identity module 717 may be provided with a respective device identifier, so that the wireless device 700 includes more than one device identifier It will be understood that instead of two SIMs 717, 717 a higher number of SIMs may be provided, for example three or more SIMs. The communication subsystem enables the wireless device 700 to communicate via a number of different communication protocols including 3G, 4G, GSM, WiFi, Wi-fi direct, Near Field Communication (NFC), Bluetooth™ and/or CDMA.

The keypad 702 and the touch-screen 704 are controlled by an application processor 718. A power and audio controller 720 is provided to supply power from a battery 722 to the communication subsystem, the application processor 718, and the other hardware. The power and audio controller 720 also controls input from the microphone 738, and audio output via the speaker 708. Also provided may be a global positioning system (GPS) antenna and associated receiver element 724 which may be controlled by the application processor 718 and which may be capable of receiving a GPS signal for use with a satellite navigation functionality of the wireless device 700.

In order for the application processor 718 to operate, various different types of memory are provided. Firstly, the wireless device 700 includes Random Access Memory (RAM) 726 connected to the application processor 718 into which data and program code can be written and read from at will. Code placed anywhere in RAM 726 can be executed by the application processor 718 from the RAM 726. RAM 726 represents a volatile memory of the wireless device 700.

Secondly, the wireless device 700 is provided with a long-term storage 728 connected to the application processor 718. The long-term storage 728 may include three partitions, an operating system (OS) partition 730, a system partition 732 and a user partition 734. The long-term storage 728 represents a non-volatile memory of the wireless device 700. The database for storing the strategy like described above may be stored for example in the user partition 734, or in the system partition 732, or in the OS partition 730.

In the present example, the OS partition 730 contains the firmware of the wireless device 700 which includes an operating system. Other computer programs may also be stored on the long-term storage 728, such as application programs, and the like. In particular, application programs which are mandatory to the wireless device 700, such as, in the case of a smartphone, communications applications and the like are typically stored in the system partition 732. The application programs stored on the system partition 732 would typically be those which are bundled with the wireless device 700 by the device manufacturer when the wireless device 700 is first sold. Application programs which are added to the wireless device 700 by the user would usually be stored in the user partition 1434.

As stated, the representation of FIG. 7 is schematic. In practice, the various functional components illustrated may be substituted into one and the same component. For example, the long-term storage 728 may comprise NAND flash, NOR flash, a hard disk drive or a combination of these.

The wireless device 700 may also have an image capturing module 1456. The image capturing module, together with a suitable application, may be used to capture/scan QR codes and process the data embedded in the QR code.

Some portions of the description herein are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the description herein, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description herein.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

According to various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It will be understood that functionality of one or more circuits may be combined in a single circuit or split up into several circuits.

Various features are described for a device, but may analogously also be provided for a method, and vice versa.

In an embodiment of the present disclosure, a method for authorizing use of a digital wallet application on a device is provided. The method includes: identifying a plurality of device identifiers of the device; sorting the plurality of device identifiers in accordance with a pre-determined sorting rule; determining authorization information based on a result of the sorting; and authorizing use of the digital wallet application on the device in response to the authorization information.

Thus, it can be seen that devices and methods have been provided to overcome the problem of ambiguity of device identifiers, for example by providing methods for authorizing use of an application on a computing device or computing devices. Such a method includes: identifying a plurality of device identifiers of the computing device; determining authorization information based on predetermined one or more of the plurality of device identifiers; and determining authorization for use of the application on the computing device in response to the authorization information. Such a computing device includes: at least one processor; and at least one memory including computer program code; the at least one memory and the computer program code configured to cause the at least one processor to: identifying a plurality of device identifiers of the computing device; determining authorization information based on predetermined one or more of the plurality of device identifiers; and determining authorization for use of an application on the device in response to the authorization information.

In the method, a plurality of device identifiers of the computing device are identified. This advantageously may eliminate randomness in a case of a computing device with more than one device identifier.

Authorization information is determined based on a pre-determined one or more of the plurality of device identifiers, and authorization for use of the application on the computing device is determined in response to the authorization information. This advantageously provides access to the application only to users that use an authorized computing device.

The plurality of device identifiers may include at least one of an International Mobile Equipment Identity, mobile equipment identifier, a media access control address, or international mobile subscriber identity. This may advantageously provide a wide range of potential device identifiers, which may provide enhanced security.

The authorization may be determined further in response to comparing the authorization information with information retrieved from a server. This may advantageously ensure that authorization is not only dependent on information on the computing device, but also dependent on information on the server, so that in case of loss of the computing device, authorization may be revoked by modifying (or deleting) the information that is usually retrieved from the server during authorization.

The authorization information may be determined in accordance with a pre-determined rule. This may advantageously allow a user to set or select or determine a rule according to his preferences.

The rule may include at least one of: determining a minimum of the plurality of device identifiers; determining a maximum of the plurality of device identifiers; determining an average of the predetermined one or more of the plurality of device identifiers; determining a sum of the predetermined one or more of the plurality of device identifiers; determining an exclusive or combination of the predetermined one or more of the plurality of device identifiers; determining a combination of the predetermined one or more of the plurality of device identifiers; determining a combination of a subset of the predetermined one or more of the plurality of device identifiers; appending the predetermined one or more of the plurality of device identifiers according to a pre-determined logic; appending the plurality of device identifiers in ascending order to determine the authorization information; appending the predetermined one or more of the plurality of device identifiers in descending order; or appending a subset of the predetermined one or more of the plurality of device identifiers. This may advantageously provide a wide range of potential rules, which may provide enhanced security.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for authorizing use of an application on a computing device, the method comprising:
  identifying, at the computing device, a plurality of device identifiers of the computing device, the plurality of device identifiers including a primary device identifier active for the computing device, wherein each device identifier of the plurality of device identifiers identifies the computing device;
  applying, at the computing device, a pre-determined rule regarding the identified plurality of device identifiers of the computing device such that authorization information is identical for each authorization of use of the application regardless of which of the plurality of device identifiers is the primary device identifier, wherein applying the pre-determined rule comprises sorting the plurality of device identifiers according to a pre-determined sorting rule;
  determining, at the computing device, the authorization information, used to subsequently determine authorization for the application, based on a result of the applying of the pre-determined rule regarding the identified plurality of device identifiers of the computing device; and
  determining authorization for use of the application on the computing device in response to the authorization information.

2. The method of claim 1, wherein the plurality of device identifiers comprises at least two of an International Mobile Equipment Identity, mobile equipment identifier, a media access control address, or international mobile subscriber identity, wherein one of the at least two is the primary device identifier that is active for the computing device.

3. The method of claim 1, wherein the authorization is determined further in response to comparing the authorization information with information retrieved from a server.

4. The method of claim 1, wherein information indicating the pre-determined rule is stored on the computing device.

5. The method of claim 1, wherein the pre-determined rule comprises at least one of:
  determining a minimum of the identified plurality of device identifiers;
  determining a maximum of the identified plurality of device identifiers;
  appending the identified plurality of device identifiers in ascending order;
  appending the identified plurality of device identifiers in descending order; or
  appending a subset of the identified plurality of device identifiers.

6. The method of claim 1, wherein the computing device is a dual SIM device having a first SIM card slot associated with a first identifier and a second SIM card slot associated with a second identifier, wherein the plurality of device identifiers comprises the first identifier and the second identifier, wherein one of the first identifier and the second identifier is the primary device identifier.

7. The method of claim 1, wherein the application on the computing device comprises a digital wallet application, wherein the computing device is a dual SIM device having a first SIM card slot associated with a first identifier and a second SIM card slot associated with a second identifier, wherein the plurality of device identifiers comprises the first identifier and the second identifier, wherein one of the first identifier and the second identifier is the primary device identifier; and
  wherein the method further comprises:
    initiating a payment process, wherein the determining of the authorization information is performed in response to initiating the payment process; and
    completing the payment process in response to the determining of the authorization for use of the digital wallet application.

8. A computing device comprising:
  at least one processor; and
  at least one memory including computer program code;
  the at least one memory and the computer program code configured to cause the at least one processor to:
    identify a plurality of device identifiers of the computing device, the plurality of device identifiers including a primary device identifier active for the computing device, wherein each device identifier of the plurality of device identifiers identifies the computing device;
    apply a pre-determined rule regarding the identified plurality of device identifiers of the computing device such that authorization information is identical for each authorization of use of an application regardless of which of the plurality of device identifiers is the primary device identifier, wherein the computer program code to apply the pre-determined rule causes the at least one processor to sort the plurality of device identifiers according to a pre-determined sorting rule;
    determine the authorization information, used to subsequently determine authorization for the application which is stored on the at least one memory, based on a result of the applying of the pre-determined rule regarding the identified plurality of device identifiers of the computing device; and determine authorization for use of the application on the computing device in response to the authorization information.

9. The computing device of claim 8, wherein the plurality of device identifiers comprises at least two of an International Mobile Equipment Identity, mobile equipment identifier, a media access control address, or international mobile subscriber identity, wherein one of the at least two is the primary device identifier that is active for the computing device.

10. The computing device of claim 8, wherein the authorization is determined further in response to comparing the authorization information with information retrieved from a server.

11. The computing device of claim 8, wherein information indicating the pre-determined rule is stored on the device.

12. The computing device of claim 11, wherein the pre-determined rule comprises at least one of:

determining a minimum of the identified plurality of device identifiers;

determining a maximum of the identified plurality of device identifiers;

appending the identified plurality of device identifiers in ascending order;

appending the identified plurality of device identifiers in descending order; or appending a subset of the identified plurality of device identifiers.

13. The computing device of claim 8, wherein the application on the device comprises a digital wallet application.

14. A method for authorizing use of a digital wallet application on a device, the method comprising:

identifying, at the device, a plurality of device identifiers of the device, the plurality of device identifiers including a primary device identifier active for the device, wherein each device identifier of the plurality of device identifiers identifies the device;

applying, at the device, a pre-determined rule regarding the identified plurality of device identifiers of the device such that authorization information is identical for each authorization of use of the digital wallet application regardless of which of the plurality of device identifiers is the primary device identifier, wherein applying the pre-determined rule comprises sorting the plurality of device identifiers according to a pre-determined sorting rule;

determining, at the device, the authorization information, used to subsequently determine authorization for the digital wallet application, based on a result of the applying of the pre-determined rule regarding the identified plurality of device identifiers of the device; and authorizing, at the device, use of the digital wallet application on the device in response to the authorization information.

15. The method of claim 14, wherein determining the authorization information comprises selecting a device identifier of the plurality of device identifiers having a maximum value.

16. The method of claim 14, wherein determining the authorization information comprises selecting a device identifier of the plurality of device identifiers having a minimum value.

17. The method of claim 14, wherein determining the authorization information comprises appending the plurality of device identifiers in accordance with the sorting.

* * * * *